United States Patent [19]
Waldron et al.

[11] Patent Number: 5,555,399
[45] Date of Patent: Sep. 10, 1996

[54] DYNAMIC IDLE LIST SIZE PROCESSING IN A VIRTUAL MEMORY MANAGEMENT OPERATING SYSTEM

[75] Inventors: Ted C. Waldron, Sunrise; Glenn E. Brew, Boca Raton, both of Fla.

[73] Assignee: International Business Machines Corporation, Armonk, N.Y.

[21] Appl. No.: 271,684

[22] Filed: Jul. 7, 1994

[51] Int. Cl.$^6$ ..................................................... G06F 12/12
[52] U.S. Cl. .......................... 395/486; 395/460; 395/487; 395/650
[58] Field of Search .................................... 395/486, 487, 395/485, 460, 463, 650, 700

[56] References Cited

U.S. PATENT DOCUMENTS

| | | | |
|---|---|---|---|
| 4,530,055 | 7/1985 | Hamstra | 395/463 |
| 4,680,700 | 7/1987 | Hester et al. | |
| 4,714,993 | 12/1987 | Livingston et al. | |
| 4,761,737 | 8/1988 | Duvall et al. | |
| 4,811,203 | 3/1989 | Hamstra | 395/469 |
| 4,868,738 | 9/1989 | Kish et al. | |
| 4,914,577 | 4/1990 | Stewart et al. | |
| 4,985,825 | 1/1991 | Webb, Jr. et al. | |
| 5,062,055 | 10/1991 | Chinnaswamy et al. | 364/551.01 |
| 5,101,485 | 3/1992 | Perazzoli, Jr. | 395/416 |
| 5,125,086 | 6/1992 | Perazzoli, Jr. | 395/486 |
| 5,237,673 | 8/1993 | Orbits | 395/497.01 |
| 5,386,561 | 1/1995 | Huynh | 395/650 |
| 5,392,415 | 2/1995 | Badovinatz | 395/406 |
| 5,493,663 | 2/1996 | Parikh | 395/486 |

OTHER PUBLICATIONS

Hanrahan, Jamie, "The Win32 API," Digital Systems Journal, Mar.–Apr. 1994, v. 16, n2, p. 36(6). Mar. 4, 1994.
Hummel, Robert L., "The magic behind virtual memory," PC–Computing, Jun. 1994, v.7, n6, p. 276(3). Jun. 1994.
Kanalakis, John M., Jr., "Examining OS/2 2.1 threads: understanding the scheduler is the key," Dr. Dobb's Journal, Jan. 1994, v.19, n1, p. 74(5).
IBM TDB Sep. 1970, pp. 1026–1027, Execution of Shared Resident Virtual Memory Pages in Large Capacity Storage.
Japanese Abstract, Memory Control Method for Paging Virtual Storage System, JP 03–127241. May 30, 1991.
Japanese Abstract, Memory Control System, JP 60–43756. Mar. 8, 1985.
Japanese Abstract, List Processor Having Virtual Memory, JP 57–30044. Feb. 18, 1982.
IBM TDB Mar. 1983, pp. 6024–6026, Dynamic Trace Mechanism for Intelligent Terminals.
IBM TDB Oct. 1989, pp. 270–273, Dynamic Multilevel Storage Policy for Managing External Page Table Space in the AIX Operating System.
IBM TDB n6 Nov. 1992, pp. 286–287, Use of Page Records to Synchronize Printing While Converting.

*Primary Examiner*—Tod R. Swann
*Assistant Examiner*—Keith W. Saunders
*Attorney, Agent, or Firm*—Bruce D. Jobse; Geoffrey A. Mantooth

[57] ABSTRACT

A data processing system has a virtual memory manager for swapping information between primary memory (such as RAM) and secondary memory (such as a fixed disk). The virtual memory manager employs an ager to determine which information in RAM is eligible for swapping out to the fixed disk. The ager links eligible information to an idle list. The idle list has minimum and maximum sizes. The ager has execution priorities that depend on the minimum and maximum sizes of the idle list. When the idle list is at the minimum size, the ager runs at a higher priority in order to identify information that can be swapped out. When the idle list is at or near the maximum size, the ager runs at a lower priority. The size of the idle list is dynamically adjusted to account for any information that is reclaimed from the idle list and also to account for any changes in the amount of swappable information (which is in non-resident primary memory). The priorities of the ager are adjusted according to the changes in the idle list sizes.

6 Claims, 7 Drawing Sheets

| NUMBER OF PAGES | PRIORITY |
|---|---|
| 13 (MIN) | TIME_CRITICAL |
| 14-25 | IDLE |
| 26 (MAX) | IDLE |

FIG. 3

| NUMBER OF PAGES | PRIORITY |
|---|---|
| 16 (MIN) | TIME_CRITICAL |
| 17-31 | IDLE |
| 32 (MAX) | IDLE |

FIG. 8

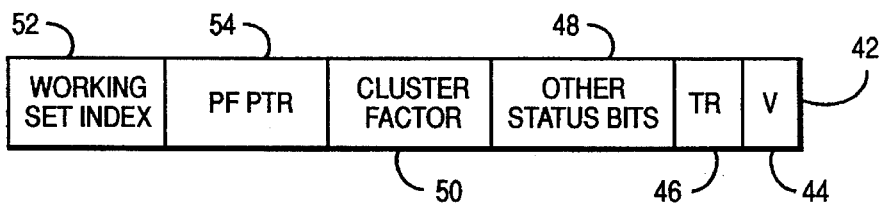
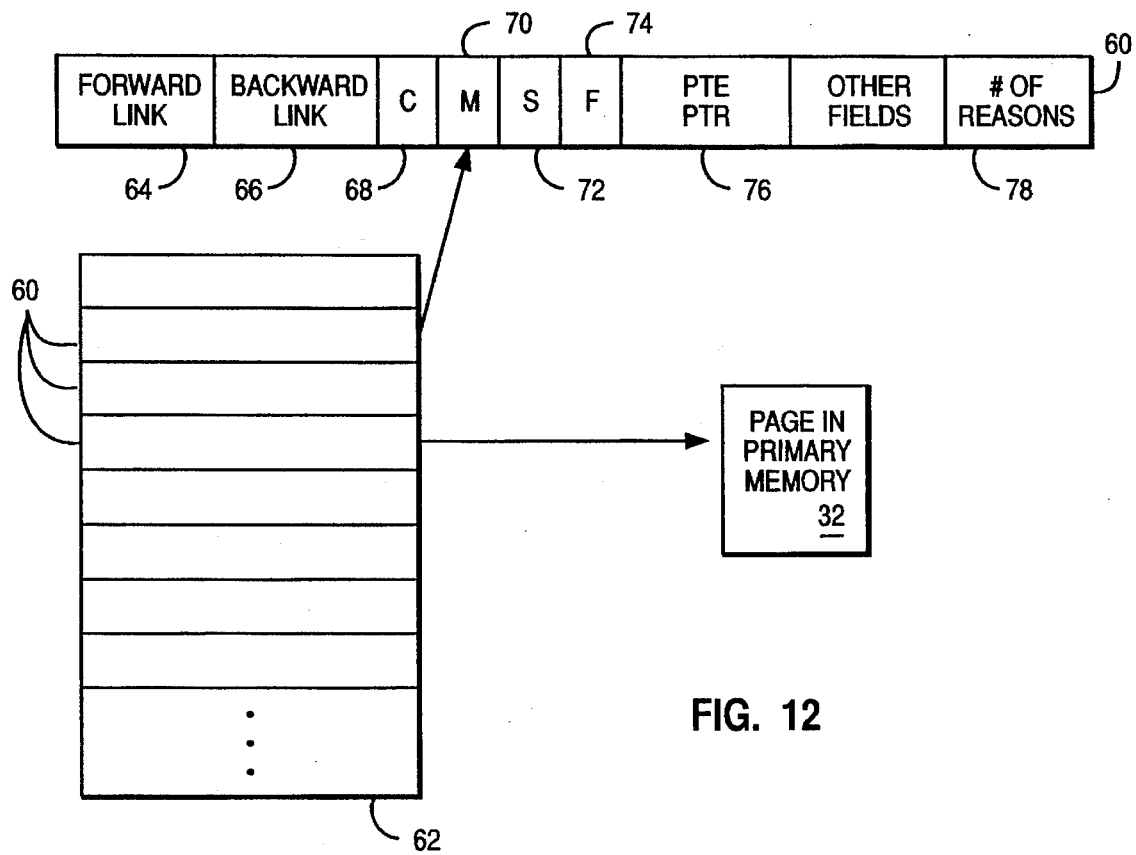
FIG. 11
FIG. 12
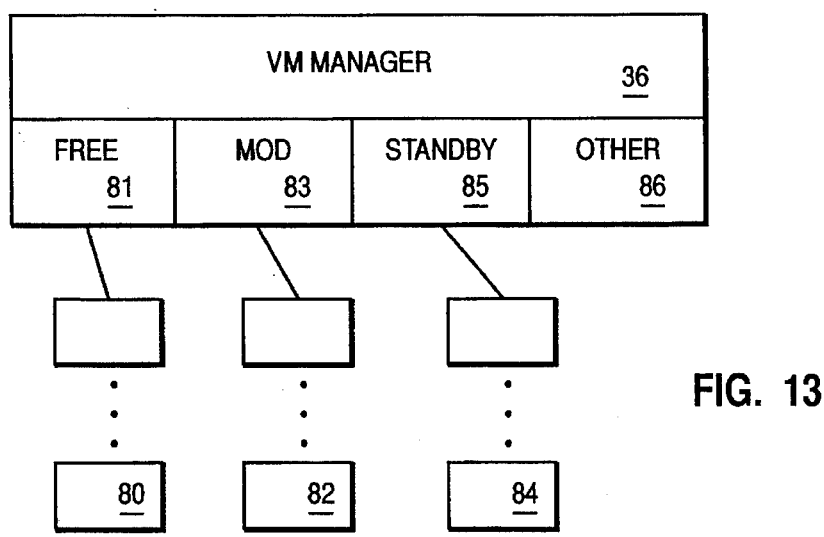
FIG. 13

5,555,399

DYNAMIC IDLE LIST SIZE PROCESSING IN A VIRTUAL MEMORY MANAGEMENT OPERATING SYSTEM

TECHNICAL FIELD OF THE INVENTION

The present invention relates to virtual memory management in data processing systems, and in particular to managing idle lists in virtual memory systems.

BACKGROUND OF THE INVENTION

Virtual memory is used to minimize the physical memory of data processing systems or computers. The physical memory of a computer is typically Random Access Memory (RAM) and serves as a primary storage for the Central Processing Unit (CPU). RAM is typically fast enough to communicate with the CPU. Unfortunately, RAM is relatively expensive. With virtual memory, a relatively inexpensive storage device with a large capacity is utilized. Typically, this storage device is a fixed (or hard) disk.

With virtual memory, the computer has the capability of addressing a memory space much larger than what is available on RAM. Information. (data, code, etc.) is moved between the fixed disk and RAM. A virtual memory manager controls the moving of information between the fixed disk and RAM.

There are several strategies employed in virtual memory management. One such strategy is to preload all the information for an application program into RAM. After the program is initialized, that information which is used only for initialization is "discarded" from RAM. Another strategy is to load information into RAM on demand (instead of preloading the information). The information is transferred in blocks referred to as pages or segments.

Still another strategy involves determining what information has not been referenced by the CPU for some amount of time. When the amount of requested RAM exceeds the amount of available RAM, then the least recently used information is swapped from RAM to the fixed disk. This creates space in RAM, wherein the requested information can be swapped in from the fixed disk to the empty space in RAM. This latter strategy is utilized by an operating system known as OS/2 (OS/2 is a trademark of International Business Machines Corporation.)

An "ager" daemon thread is employed by the virtual memory manager to anticipate a next request from memory by determining which information in RAM is suitable for swapping out to fixed disk. Daemon threads are processes that execute in the background, so that a user typically is not aware of the thread. The ager runs in response to a request from memory. The ager is able to determine if information in RAM has been recently referenced through the use of a page table. The page table has entries for the pages (or blocks of information) contained in RAM. When a request from memory is made, the ager marks a number of pages as "clean" in the page table entries, in order to establish a reference. When an executing program accesses a page, the entry for that page is marked, thereby indicating that a reference to that page has been made. On subsequent runs of the ager, the least recently used pages are linked to an idle list. Pages on the idle list are candidates for swapping out from RAM to fixed disks. Pages on the idle list can be reclaimed whenever those pages are accessed by a running thread (or executing program). Reclaiming pages from the idle list (which pages are still in RAM) is more efficient than reloading the pages from fixed disk into RAM.

The prior art attempts to maintain the idle list at a size of 40 pages. This is accomplished by having the ager run at various priorities, depending on the size of the idle list. The following table illustrates the number of pages that are on the idle list (within a range of pages defined by a minimum and a maximum) and the respective priority of the ager:

| Min Idle | Max Idle | Priority |
| --- | --- | --- |
| 0 | 10 | TIME_CRITICAL |
| 11 | 20 | REGULAR |
| 21 | 30 | REGULAR |
| 31 | 40 | IDLE-- |

Thus, if the idle list contains few or no pages, then the priority of the ager is TIME_CRITICAL. Having this high priority causes the ager to run in order to fill up the idle list. If the idle list contains an intermediate number of pages, then the priority of the ager is REGULAR. If the idle list contains a number of pages that is close to forty, then the priority of the ager is IDLE. With an IDLE priority, the ager need only run during the CPU's idle cycles because the idle list is either full or almost full.

A problem arises in computers that have small memory configurations or overcommitted systems. This is because the ager runs to maintain the idle list at a fixed size. However, running the ager utilizes a large percentage of CPU time just to maintain the size of the idle list. This interferes with, and may even preempt, threads doing actual work. In fact, in some instances (for example in regular and server classes) user threads or processes which may not need memory to run are preempted by the ager. Thus, the ager executes to anticipate the next request for memory, when the user thread does not need memory and is unable to run because of the ager.

Another problem is that the prior art ager processes do not take into account the number of resident pages in the system. The ager is set up at initialization based upon the amount of physical memory at that time. However, after initialization, the number of swappable pages in the system can be reduced. Such a change could come about, for example, by adding software which allocates resident memory. Such software could be a LAN or else simply running a program that allocates resident memory. Because the size of the idle list is fixed, the ager compensates by running more often in order to stay abreast of the reduced number of swappable pages in the system. Again, the frequent running of the ager utilizes CPU time.

SUMMARY OF THE INVENTION

It is an object of the present invention to provide a method and apparatus that dynamically updates the size of an idle list based on the actual number of swappable pages.

It is a further object of the present invention to provide a method and apparatus that modifies the priority of the ager thread, so that the ager thread will not interfere with running programs that do not request memory.

The present invention provides a method and apparatus for use in a data processing system having primary memory and secondary memory and a virtual memory manager that swaps information between the primary and secondary memories. The virtual memory manager employs an ager to determine which information can be swapped from primary memory to secondary memory. The virtual memory manager provides a listing of the information. The listing has a size based upon the amount of information contained in the listing. The method and apparatus dynamically determine an execution priority of the ager relative to non-ager methods on the data processing system. An initial size of the listing is determined. The priority of the ager is set based upon the initial size of the listing. It is then determined if any information is reclaimed from the listing for use in the primary memory. The size of the listing is redetermined based upon the amount of the reclaimed information. The priority of the ager is then reset based upon the redetermined size of the listing.

In accordance with one aspect of the present invention, the initial size of the listing is based upon the difference between total primary memory and an initial amount of resident primary memory. The size of the listing is redetermined based upon the difference of the total primary memory and a subsequent amount of resident memory. Thus, the present invention accounts for changes in resident memory. Such changes typically reduce the amount of swappable information. The present invention adjusts the size of the listing as well as the priority of the ager so as to run less frequently.

In still another aspect of the present invention, the listing has initial minimum and maximum sizes. The ager has a first priority based upon the initial minimum size and a second priority based upon the initial maximum size. The minimum and maximum sizes of the listing are redetermined based upon the amount of reclaimed information. The firsts and second priorities are reset based upon the redetermined minimum and maximum sizes of the listing.

The present invention has several advantages over prior art ager schemes. One advantage is due to the priority of the ager process being modified so as to run mostly in the idle class. This allows non-ager threads or processes to run without interruption by the ager in slightly overcommitted data processing systems. The ager identifies those pages in RAM that are least recently used and therefore are candidates for swapping out to secondary memory. This enables most of the ager activity can be accomplished during the CPU's idle cycles.

Another advantage of the present invention is that the ager's workload is in effect a function of the memory request of the last thread to execute. This is because the number of reclaims from the idle list is monitored on a per thread basis. Compute bound threads which do not need memory do not cause the ager to be unnecessarily executed. Those threads that request memory intensively and experience page reclaims receive favored ager activity and additional reclaim benefits. Thus, the ager has minimum interference with executing threads or processes.

Still another advantage is that the ager's run or execution frequency accurately reflects the amount of swappable pages in the data processing system. This is because the ager redetermines the idle list minimum and maximum sizes based upon resident memory. This is useful when a program, such as a device driver, allocates memory. Because the ager priority is changed according to the updated idle list size, the ager need not run excessively due to a reduced number of swappable pages in RAM.

BRIEF DESCRIPTION OF THE DRAWINGS

FIG. 3 is an exemplary table of priorities for the ager thread, as determined by minimum and maximum sizes of the idle list.

FIG. 4 shows a method for initializing parameters used by the ager thread. FIG. 5 shows a method for counting reclaimed pages. FIG. 6 shows a method for accounting for reclaimed pages before invoking the ager thread. FIG. 7 shows a portion of the ager thread, wherein the priority table such as is shown in FIG. 3 is redetermined.

FIG. 8 is another exemplary table of priorities for the ager thread, as redetermined using the method of FIG. 7.

FIG. 11 illustrates a data structure for a page table entry of the preferred embodiment.

FIG. 12 illustrates a data structure of a page frame record of the preferred embodiment.

FIG. 13 is a block diagram of a plurality of memory managing lists of the preferred embodiment.

DESCRIPTION OF THE INVENTION

Figure 1:
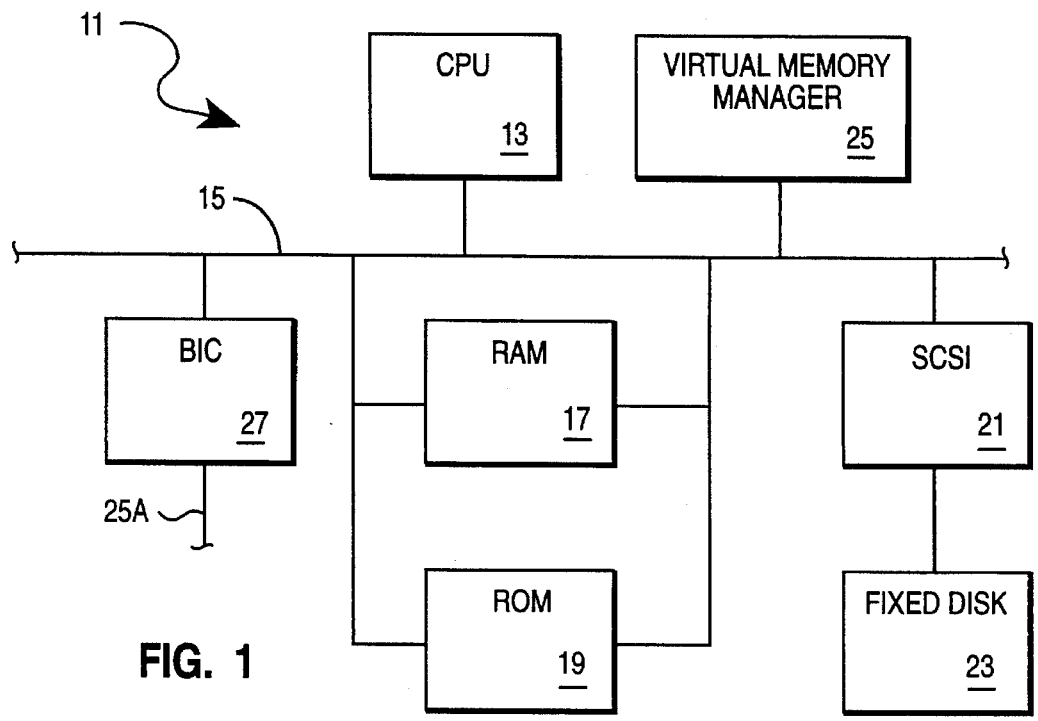
FIG. 1 is a block diagram of selected internal components of a personal computer, upon which the present invention can be practiced.

In FIG. 1, there is shown a block diagram of internal components of a personal computer 11 upon which the present invention can be practiced. The computer 11 has a Central Processing Unit (CPU) 13. In the preferred embodiment, the CPU 13 is an Intel 80386 or 80486 microprocessor, although the present invention can be used with other processors as well. The CPU 13 is connected to a local bus 15. Also connected to the local bus 15 is physical memory in the form of Random Access Memory (RAM) 17 and Read Only Memory (ROM) 19. The RAM 17 is typically Dynamic Random Access Memory (DRAM) configured in Single Inline Memory Modules (SIMMs).

Also connected to the local bus 15 is a Small Computer Systems Interface (SCSI) controller 21.

The SCSI controller 21 is connected to a fixed (or hard) disk 23. In addition, the SCSI controller 21 may be connected to other storage devices such as a floppy disk drive and to other memory in the form of RAM.

The local bus 15 is connected to an Input/Output (I/O) Bus 25A by way of a Bus Interface Controller (BIC) 27. The BIC 27 functions as a protocol translator, memory control and DMA controller, among other functions. The I/O Bus 25A is connected to a keyboard adaptor, a printer, and other input/output devices.

The present invention can be implemented on other types of computers besides the computer 11 shown and described in FIG. 1.

The present invention is implemented by way of a virtual memory manager 25. The virtual memory manager may be part of an overall memory manager and typically includes software and hardware components. The software components are typically integrated into an operating system on the computer 11. The operating system is located in RAM 17 and executes when necessary to manage the operations of the computer. One such operating system is OS/2, which is used in the preferred embodiment.

The memory manager 25 manages the virtual memory by moving blocks of information between the RAM and the fixed disk. When an application program (such as a word processing program or a spreadsheet program) begins execution on the computer, it attempts to allocate space in RAM. If the application program attempts to access a block of information that is not contained in RAM (or else is in RAM but is on the idle list, then a page fault occurs. The virtual memory manager can swap in the requested block of information from the fixed disk to RAM. But first, the virtual memory manager must ensure that the RAM contains a sufficient amount of room for the requested block of information. This is done by using several techniques. One such technique is to move blocks of information around in RAM to create larger spaces in RAM. Another technique is to discard one or more blocks of information from RAM. Information that is code does not have to be swapped out to a fixed disk, because the fixed disk already has a copy of the code. Still another technique is to swap out blocks of information from RAM to the fixed disk.

The present invention operates in conjunction with the lattermost technique of swapping out blocks of information from RAM to the fixed disk. The blocks are swapped out to a swap file contained on the fixed disk. The virtual memory manager utilizes an ager thread or process to determine which blocks of information in RAM are suitable candidates for swapping out. Ager processes are conventional and commercially available. The ager uses a Least Recently Used (LRU) algorithm to determine which blocks of information in RAM are suitable candidates for swapping out from RAM. Thus, the ager identifies those blocks of information in RAM that have not been used by the application program for some time and that are therefore unlikely to be used in the near future.

Figure 2:
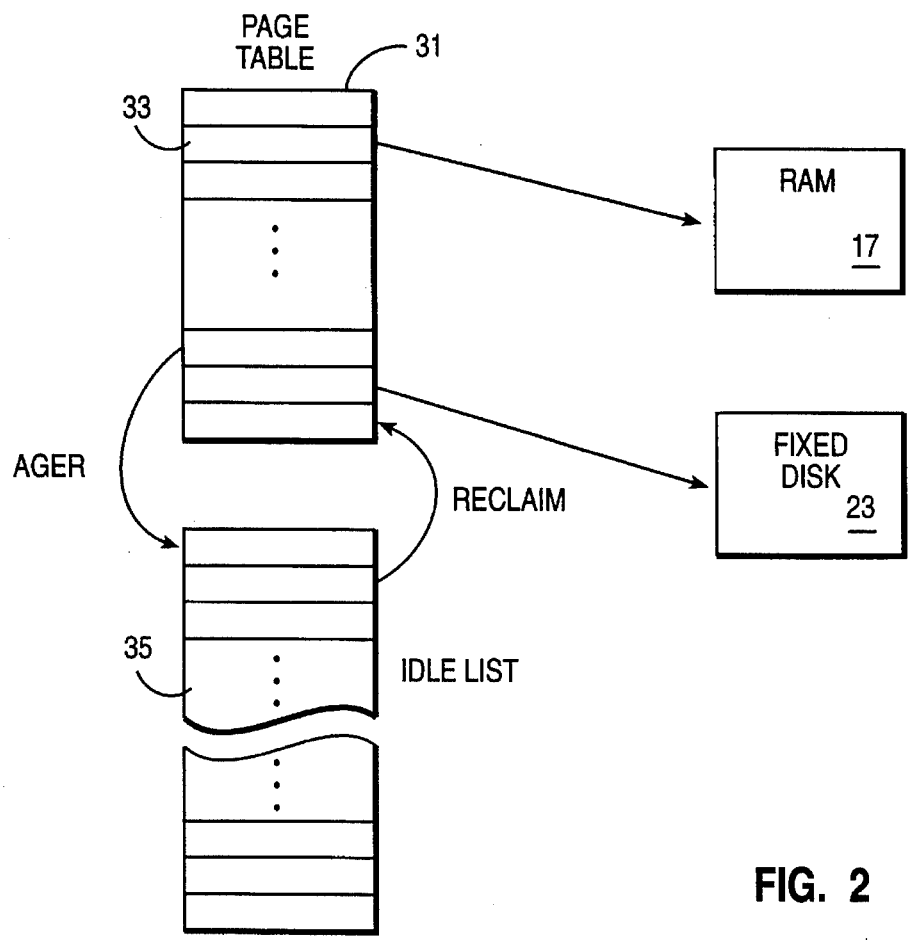
FIG. 2 is a schematic diagram of a page table, an idle list and memory.

A typical configuration of memory and its organization are shown in FIG. 2. One type of block of information is known as a page. Pages of memory are of uniform size (as opposed to segments of memory which have varying sizes). There is provided a page table 31. The page table has a page table entry 33 for each page of memory. The page table entry 33 provides identifying and status information on the respective page. One field of the page table entry provides the status of the use (whether recent or not) of the page. For example, this field could be a number of reasons field, having several bits. U.S. Pat. No. 5,125,0861, discusses a typical data structure for a page table entry, as well as page tables in memory. There is also an idle list 35 that contains information regarding those pages that are suitable candidates for a swap out to the fixed disk 23.

Figure 9:
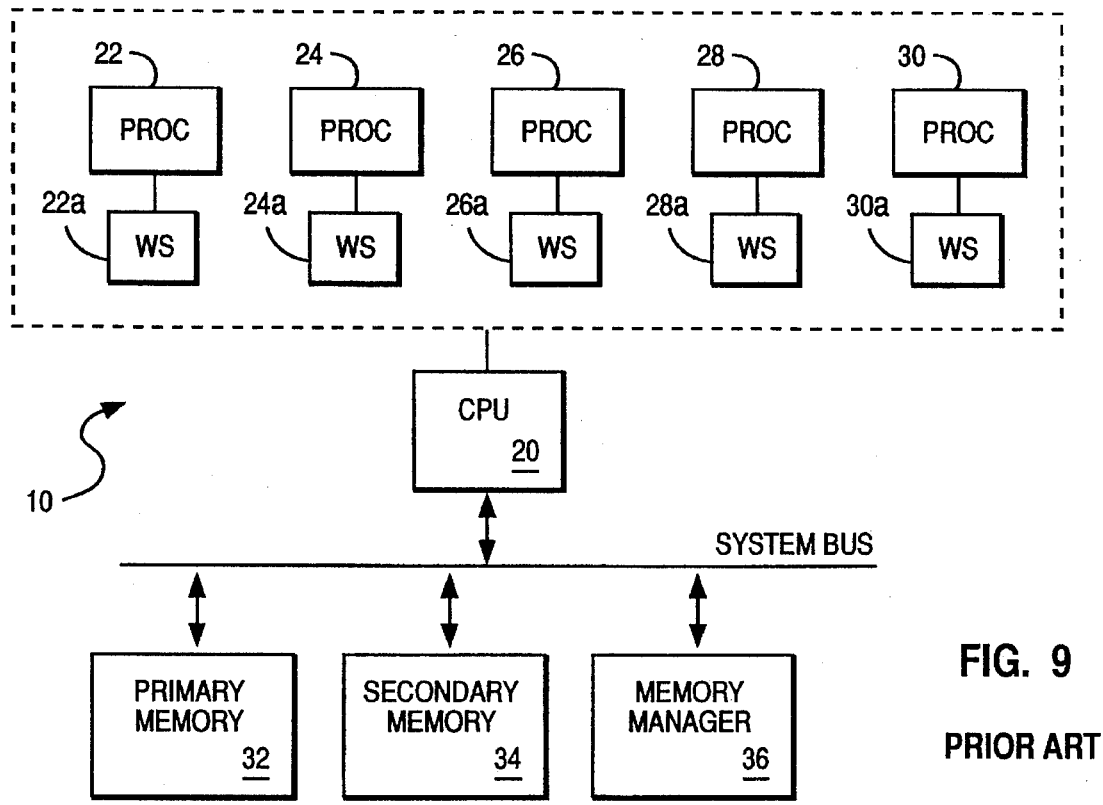
FIG. 9 is a block diagram of a computer system with a virtual memory management subsystem.

Referring to FIG. 9, s computer system 10 is illustrated. The compute system is comprised of a central processing unit (hereinafter "CPU") 20, a plurality of processes 22–30 and primary memory 32, secondary memory 34 and a memory manager 36. Directly connected to the CPU 20 is the primary memory 32. The primary memory 32 is a high speed random access memory. It facilitates CPU processing by permitting fast memory access times. Secondary memory, on the other hand, is usually a large, relatively slow memory device. For example, magnetic disc drives are frequently used as secondary memory. Secondary memory is generally characterized by a slow access time and being relatively inexpensive, compared to primary memory.

In the computer system 10, secondary memory 34 is much larger than primary memory 32. Each process 22–30 performs operations using primary memory 32 which is the only memory that a process "sees." Additional memory is located in the secondary memory and when that information is needed it is transferred into primary memory for the requesting process to access. Since primary memory is small, relative to secondary memory, information is constantly swapped in and out of primary memory. The device which controls the transfer of data between primary and secondary memory is called a virtual memory manager 36 (hereinafter sometimes called "memory manager"). The memory manager 36 utilizes a virtual memory scheme.

Many virtual memory schemes are used in the prior art. An example of one is now illustrated. In FIG. 9, a computer system 10 concurrently runs several promises 22–30 using the CPU 20. Each of these processes 22–30 is allocated a certain portion of primary memory 32. More specifically, each process has a virtual memory space which may far exceed the amount of primary memory that is assigned to it. The portion of each virtual memory space which is currently stored in primary memory is specified by a "working set" list 22a–30a which is maintained for each process. Thus each process has a "working set," and all other data for the process is storm in a secondary memory 34.

The virtual memory manager 36 controls which portions of each process's virtual memory space is to be stored in primary memory and dynamically changes the allocation of primary memory as required.

Figure 10:
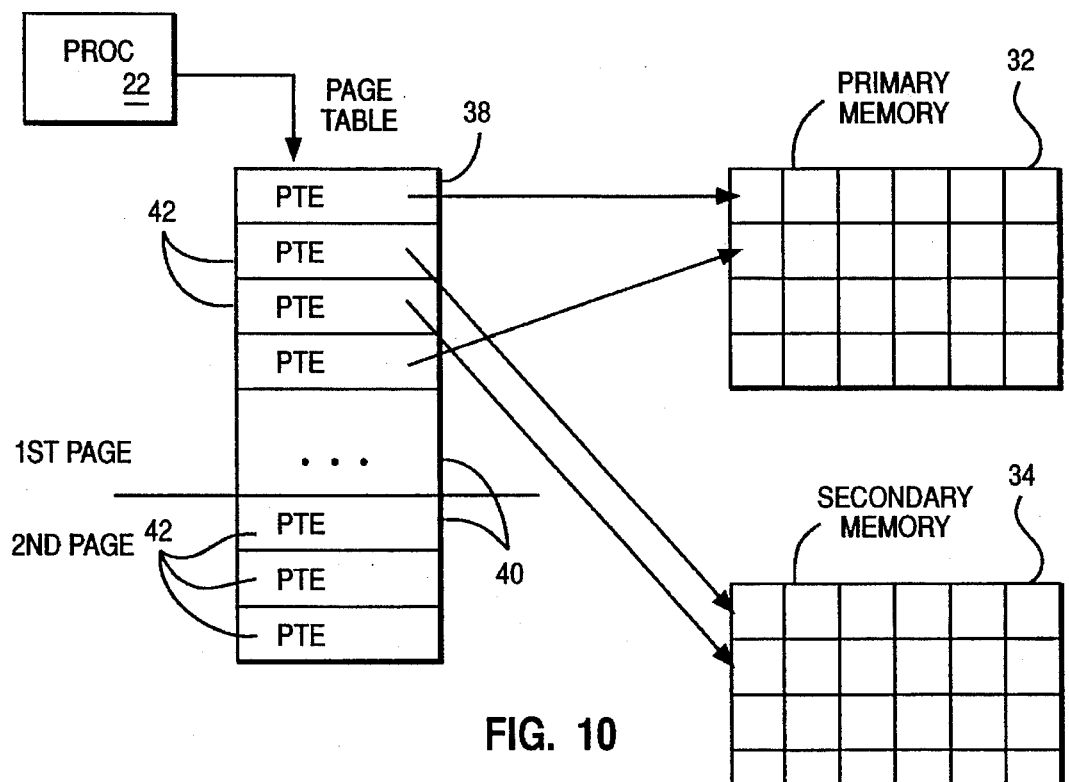
FIG. 10 is a block diagram which illustrates one aspect of the memory mapping structure for the virtual memory space of one process.

Referring to FIG. 10, in a virtual memory system, both physical and virtual memory spaces are divided into equally sized "pages." The memory manager 36 (shown in FIG. 9) keeps track of the pages for each process running in the computer 10 by using a table called a "page table" 38. The page table 38 for any one process 22 contains many "page table entries" in (PTEs) 42, each of which specifies the location and status of one page in the process's virtual memory space.

Since a process typically uses many pages of memory, there will be a corresponding number of PTEs 42. These PTEs are stored in an array (i.e., table) which itself occupies multiple pages of memory. For example, a process might use four thousand pages of memory and the four thousand PTEs might occupy four pages. Each page used to store PTEs is called a "page table page" 40 (hereinafter "PTP").

When a page of data is requested by a process and that page is not in primary memory 32, the memory manager 36 finds that page in secondary memory and copies it into primary memory 52. Often, when a page in secondary memory is requested by S1 process 22, logically contiguous pages will subsequently be requested. To improve the efficiency of swapping in pages from secondary memory, a "cluster" of logically contiguous pages are read into primary memory along with the requested page.

Referring to FIG.11, a data structure for a page table entry (PTE) 42 is illustrated. As indicated in the preceding discussion, the PTE 42indicates status and location for a page of data. Every page in the virtual memory space of a process has a PTE 42. For every process (22–30 of FIG. 9) there is a page table 38. The page table 38 for a particular process contains PTEs for all the pages of memory that are used by that process. From the perspective of the process, the page table is a continuous list. In actuality, the page table may have a plurality of levels.

The PTE data structure 42 has a plurality of fields 44–52. The state of these individual fields determine the overall status of the PTE 41. It is important to note that status of a PTE 42 and the status of the corresponding page are one and the same. Thus, when a PTE is said to have a particular status, it is actually the corresponding virtual memory page which has that status. The valid "V" field 44 in the PTE is a binary value which indicates when a PTE 42 is valid. A valid PTE corresponds to a page that is in the working set. Conversely, invalid PTEs are not in the working set. There are several distinct invalid states as discussed below.

The transition "TR" field 46 is a binary value which indicates whether the PTE 42 is "in transition." A PTE 42 is in transition if it is in primary memory 32, but not in the working set. Conversely, a page that is not in transition is either "valid" or in secondary memory 34.

Each PTE 42 contains a field 50 called the cluster factor. The cluster factor 50 specifies the number of contiguous pages which should be read in when the page corresponding to the PTE is read in. Space 48 is allotted in the PTE 42 for other status bits, Some of these other status bits work in conjunction with the invalid designation. For instance, these other status bits could be used to indicate that a page in secondary memory is in an image or a paging file. An image file is any data or program file which can be retained after the process terminates. A paging file, on the other hand, represents a compilation of temporary data.

Another invalid state which may be designated by a PTE 42 is the "invalid and demand zero" state. When a particular process requires an additional page of memory, (not specific data from secondary memory, but one that it can use), a page of zeroes is created and moved into the working set. When the page of zeroes is added to the process working set, the PTE becomes valid.

Another state that a PTE 42 may have is "inaccessible." A PTE with an "inaccessible" status corresponds to a portion of virtual memory that is undefined and unusable.

Whenever a process tries to access a page not currently in primary memory, thereby causing a page fault, the memory manager 56 tries to find a set of logically contiguous pages, including the target page which has been faulted on, equal in size to the cluster factor Logically contiguous pages are pages at sequentially ordered addresses. To do this, the memory manager 36 first forms the largest possible set of contiguous pages, up to the size of the duster factor 50, starting at the target page and moving toward larger virtual memory addresses. If the resulting set of page is smaller than the cluster factor 56, the memory manager 56 tries to expand the cluster by scanning lower virtual memory address. Note that any virtual memory page which is in primary memory (i.e., valid) will terminate the cluster, and that a cluster will not be expanded if it requires reading in a swapped out page table page. In summary, a page fault on a single page results in the reading in of a number of pages.

The PTE 42 also contains a working set index 52. The working set index S2 points to the "slot" in the working set list 22a occupied by the corresponding page. The index S2 is zero when the page is not in the working set. PTEs additionally contain a page frame pointer 54 (hereinafter "PFP"). The PFP 54 points to the physical location of the page which the PTE references, When a page is valid, the PFP 54 points to a page in primary memory 31. When a page is in the paging or an image file, the PFP 34 points to a page in the secondary memory 34.

Referring to FIG. 12 a page frame record (hereinafter "PFR") 60 and a PFR database 61 are shown. A PFR 60 exists for every page in primary memory 31. All of the PFRs 60 are contained in a PFR database 62 which is an array of records 60 in primary memory 32. Each PFR 60 contains a forward link 64 and a backward link 66 which ran be used to put the corresponding page on one of several doubly linked lists, which will be described below.

Fields 70–74 indicate whether the page to which the PFR 60 points is on the modified, standby or free list, etc. The lists are described in detail, below with reference to FIG. 5. The modify bit 70 indicates whether the page to which a PFR 60 points is on the modified list. The standby bit 72 indicates whether the page to which a PFR points is on the standby list. The free list bit indicates whether the page to which the PFR 60 points to is on the free list.

The cluster bit 68 indicates whether the page referenced by the PFR 60 was brought into primary memory as a cluster page. When a page is brought into primary memory as a cluster page it is placed on the standby list. Therefore, such a page would have both its cluster bit 68 and its standby bit 72 activated to indicate its status.

The PTE pointer 76 points to the PTE, if any, which corresponds to the same page in primary memory as this PFR 60. Note that every page in the working set of a process has both a PTE 42 and a PFR 60 which stored data indicating different aspects of the status of that page.

Another field in the PFR 60 is called the "number of reasons to keep a page table page in primary memory" (hereinafter "number-of-reasons") 78. The number-of-reasons 78 is equal to the number of PTEs in a PTP (40 of FIG. 10) that are in the valid state or "in transition" state. When the number-of-reasons 78 is zero for a PTP 40, the PTP 40 may be moved out of primary memory 32 and into secondary memory 34.

Referring to FIG. 13, a plurality of lists and their relation to the virtual memory manager 36 are illustrated. In primary memory 32, each process has a number of pages that are used by its particular working set. An additional portion of primary memory contains lists that are used by the virtual memory manager 36. More specifically, the memory manager tries to maintain a set of free pages which can be allocated to the various processes when new pages are read in from secondary memory. The memory manager maintains a free list 80, a modified list 82, and a standby list 84. Each list is a doubly linked list of pages in the primary memory 32.

The free list 80 is a doubly linked list of physical memory pages that are available for use in the primary memory 32 by any process 22–30. Pages are added to a tail of the list 80 and always removed from a head. A page may be placed on the free list 80 when its number-of-reasons 78 in its PFR. 60 becomes zero (i.e., the number-of-reasons to keep it in primary memory is zero). Associated with the free list 80 is a list head 81 that contains pointers to the first and last pages on the list 80, and a count of the number of pages in the list 80.

The modified list 82 is a doubly linked list of physical memory pages that need to have their contents written back to secondary memory before reuse. A page is placed in the modified list 82 when it is removed from the working set of a process and the modify bit 70 of its PFR 60 is set. When the modify bit 70 is set, it indicates that the page it points to has been altered since it was last read into primary memory 32 (e.g., from an image file) or since the page was first created if the page did not previously exist.

Associated with the modified list 82 is a list head 83 that points to the first and last page on the list 82, and a count of the number of pages in the list 82. Memory management 36 also maintains a high and low limit count for the modified page list 82. When the number of pages on the modified list 82 exceeds the high limit, some of the modified pages are written to secondary memory 34.

The standby list 84 is a doubly linked list of physical memory pages that are available for re-use. Pages are normally added to the tail and removed from the head of the list 84. When a fault occur on a page on the standby list 84 (discussed below), the page is removed from the standby list 84 regardless of its position in the list. A valid page is placed on the standby list 84 when its number of reason field 78 in the PFR 60 becomes zero and the modify bit 70 of its PFR is not set. The standby list 84 is also the position in primary memory where clustered pages are located until they are read into a process's working set. Associated with the standby list 84 is a list head 85 that points to the first and last pages on the list 84 and which also stores a count of the number of pages in the list M.

The other lists 86 include a zeroed page list which provides zero pages to the free list 80, and a bad page list which links together all the pages of memory that are considered unusable due to memory parity errors.

Referring now to FIGS. 4–7, the flow charts illustrating the method of the present invention will be described. In the flow charts, the following graphical conventions are utilized: a rectangle is used to illustrate a process or function, and a diamond is used to illustrate a decision. These conventions are well understood by programmers skilled in the art of data processing systems, and the flow charts are sufficient to enable a programmer skilled in the art to write code in any suitable programming language, such as Assembly language, C or PASCAL for a computer such as the IBM Personal System/2 (PS/2) family of computers which supports these languages. (Personal System/2 and IBM are trademarks of International Business Machines Corporation.)

Figure 4:
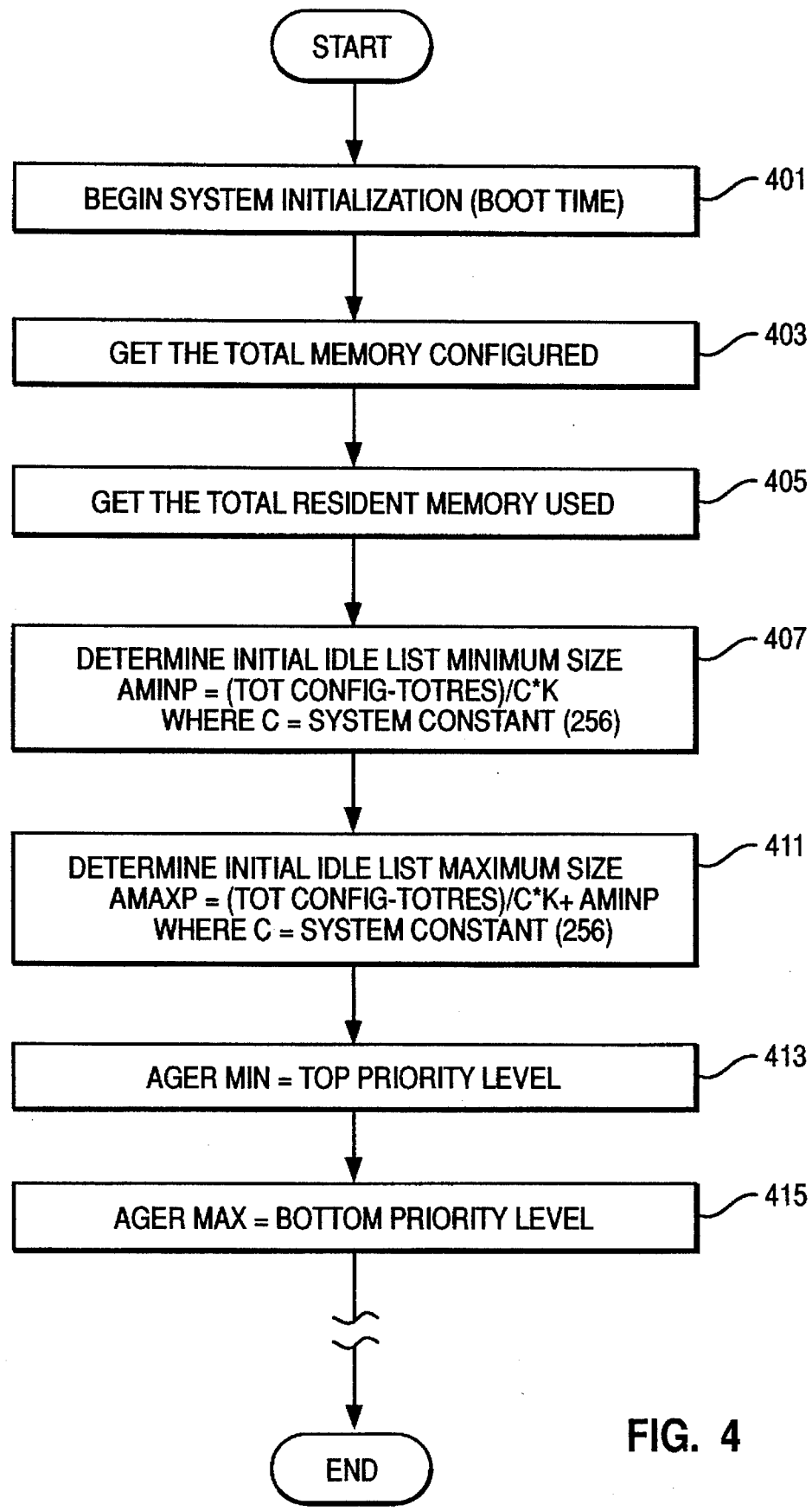
FIGS. 4–7 are flow charts of various methods of the present invention.

Referring now to FIG. 4, the ager initialization method during system boot up will be described. In step 401, the initialization of the computer is begun. This typically occurs during booting or rebooting of the computer, wherein the operating system is loaded from the fixed disk into RAM. The initialization has other steps regarding initialization of subsystems, such as RAM, and processes. These steps are conventional and well understood in the art. For example, the CPU has all of its registers cleared, with the exception of one register, which is loaded with a vector to the initial boot code in ROM or on fixed disk. In the description herein, only the initialization of the ager process will be discussed.

The ager process is initialized in steps 403–415. In step 403, the method gets the amount of total memory (RAM) that is configured on the computer. For example, the computer may contain 16 MB of RAM. This would be the total memory configured. In step 405, the method gets the total resident memory that is used. This is the amount of RAM that is taken up by the operating system and any other programs, application or otherwise (such as the ager itself), that are resident in RAM. For example, the computer may contain 3 MB of total resident memory.

Now the method is able to determine the maximum and minimum sizes for the idle list. In step 407, the method determines the minimum size (AMINP) of the idle list by determining the difference between the total configured memory (TOT CONFIG) and the total resident memory (TOTRES). Continuing with the example, this difference would be 13 MB. Then, this value is converted to pages by dividing by both a page conversion factor and a system constant. The page conversion factor is, for example, 4096 (4096 bytes per page). The system constant C is an arbitrary value used to select the size of pages. In the example, C is 256. Thus, in the example, AMINP is 13 pages.

In step 411, the method determines the maximum size (AMAXP) of the idle list. In the preferred embodiment, the maximum size of the idle list is twice the minimum size. However, other methods or factors of determining the maximum size of the idle list could be used. In the example, AMAXP is 26 pages.

In steps 413 and 415, the priority of the ager process is set, based upon the number of pages in the idle list. In step 413, the minimum size of the idle list causes the ager to have a top level priority. In OS/2, this priority is TIME_CRITICAL. In addition, each priority may have levels. For example, in OS/2, each priority has 32 levels. One of these levels is chosen for the ager priority. In step 415, the maximum size of the idle list causes the ager to have the bottom level priority (IDLE in OS/2). In addition, the ager runs at the bottom level priority for all other sizes of the idle list.

The table of FIG. 3 shows an ager priority table constructed using FIG. 4 and the example discussed above. The minimum number of pages on the idle list is 13 and provides the highest priority. The other sizes of the idle list (14–26 pages) provide the lowest priority. Thus, if the idle list contains 13 or fewer pages, then the ager has a priority of TIME_CRITICAL. Such a high priority will cause the ager to execute before lower priority programs or processes, in order to maintain at least a minimum number of swappable pages on the idle list. If the idle list contains 14–26 pages, then the ager has a priority of IDLE. Such a low priority will cause the ager to execute only during idle times of the computer, as there is only a minimal requirement for swappable pages on the idle list. If the idle list contains more than 26 pages, then the ager is not run at all.

After step 415, the method continues with other steps involved in the initialization of the computer. These additional steps are unrelated to the ager and will not be discussed herein.

The method of FIG. 4 can be contained in the initialization code for the data processing system 11. This code can be located, for example, in ROM 19.

Figure 5:
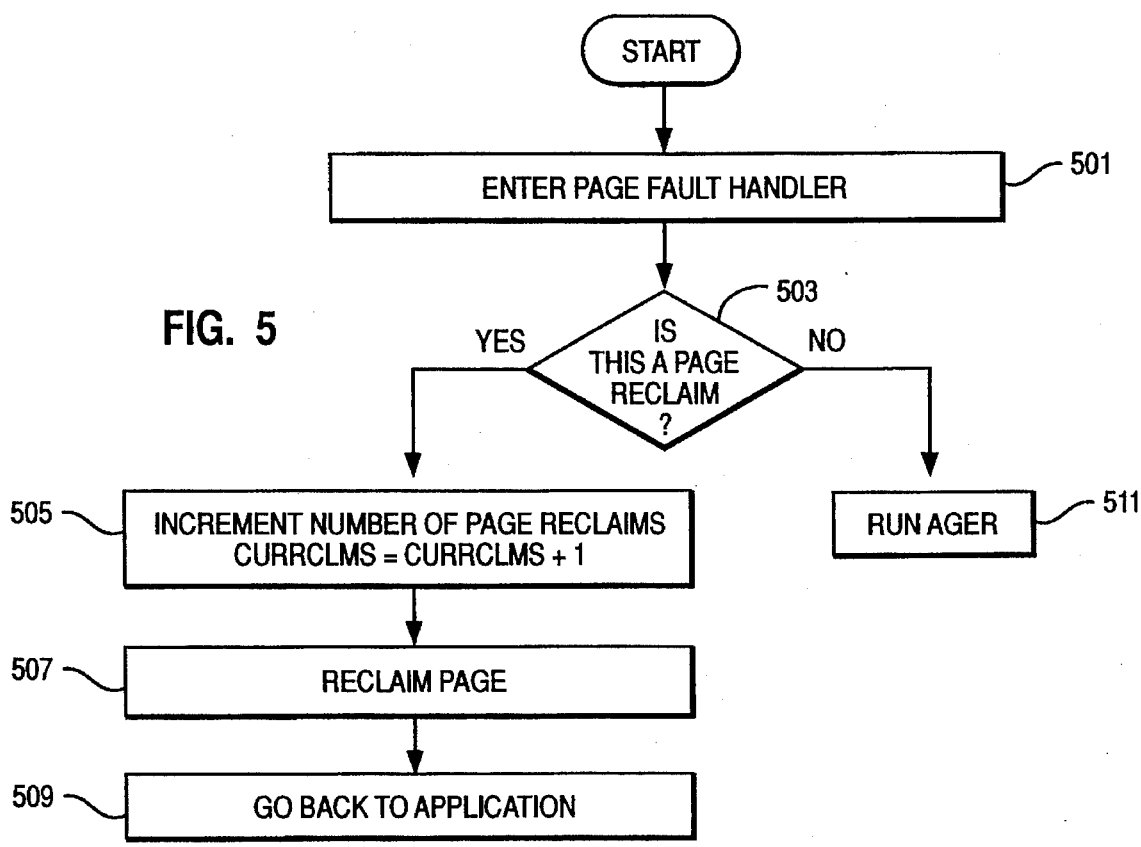

After the computer has been initialized, a user can execute various application programs. For example, the user may execute a word processor application program. During execution, the word processor accesses one or more pages of information in memory. The request for pages is handled by the virtual memory manager 25. If a particular page that is requested by the word processor is not in RAM (or else is in RAM but is on the idle list, then a page fault occurs. Referring to FIG. 5, the handling of a page fault will now be described with respect to the present invention.

In step 501, a page fault handler is entered. With the exception of step 505, the page fault handler is a conventional part of the operating system. It determines a vector location to go to in RAM and traps the computer from further executions outside of the page fault handler. The page fault handler determines if there is sufficient space in RAM to accept information that is swapped in from the fixed disk. If there is insufficient space in RAM, then space can be created by discarding information, by moving information around in RAM and by swapping out information to the fixed disk. In step 503, the page fault handler determines if the requested page is on the idle list to be reclaimed. If the result of step 503 is YES, then the number of page reclaims (CURRCLMS) is incremented by 1, step 505. In step 507, the page is reclaimed from the idle list (see FIG. 2), wherein any linkage between the page's entry in the idle list 35 and the respective Page Table Entry 33 is removed. In step 509, the page fault handler returns to the application program. The application program thus continues executing, with access now being provided to the requested page, which is in RAM.

Returning now to step 503, if the result is NO, there is no page reclaim, then the handler proceeds to step 511. In step 511, the ager is run at the specified priority. Using the example shown in FIG. 3, if the idle list has 13 pages, then the ager is run at a priority of TIME_CRITICAL. If the idle list has 14–26 pages, then the ager runs at a priority of IDLE.

Figure 6:
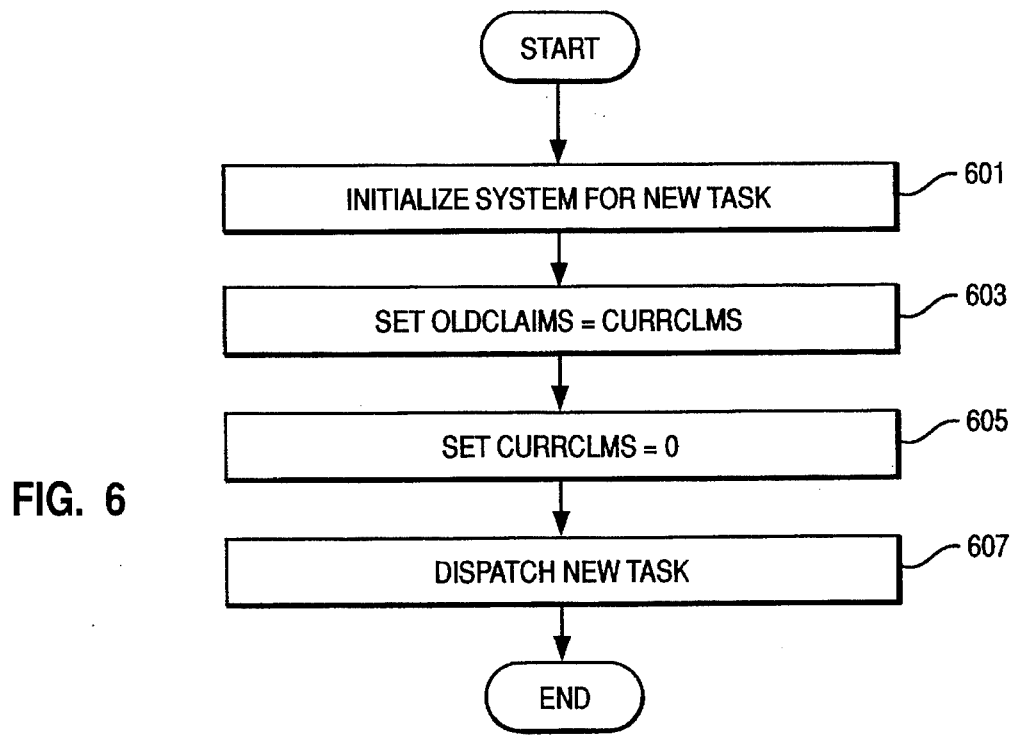

Referring now to FIG. 6, preliminary steps are taken before the ager is dispatched for execution. In step 601, the computer system is initialized for the new task (which is the running of a new thread or process). This typically includes clearing selected registers and allocating a portion of RAM for the new process. In step 603, the number of page reclaims (CURRCLMS) since the last dispatch is saved as (OLDCLAIMS). In the example, this is the number of page reclaims by the word processing program before the ager was called. Then, in step 605, the number of page reclaims (CURRCLMS) is reset to zero. In step 607, the new task (the ager) is dispatched.

Figure 7:
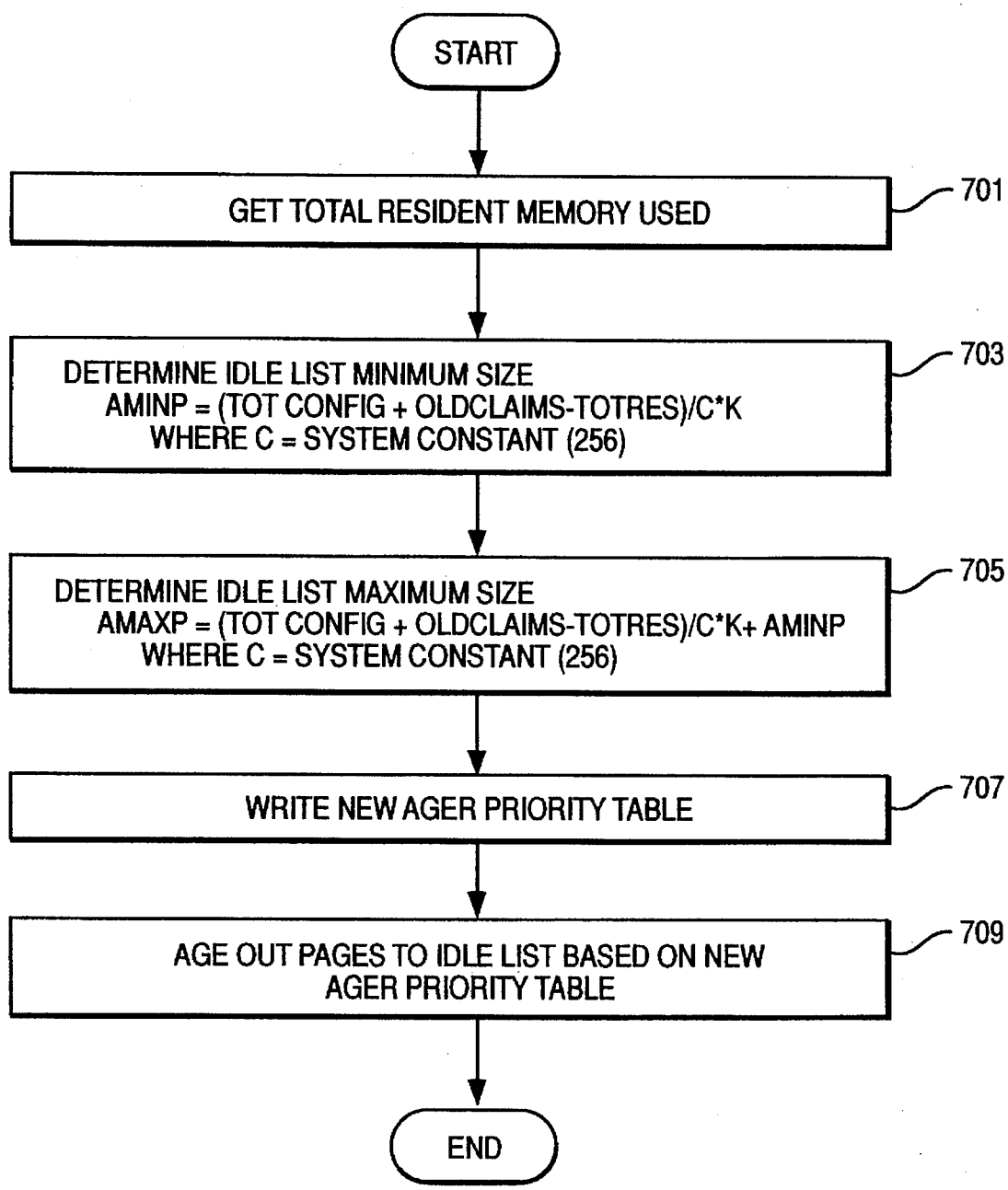

After being dispatched, the ager is executed, FIG. 7. In step 701, the method gets the total resident memory used.

In addition to adding pages to the idle list, the method of FIG. 7 also redetermines the size of the idle list and the priority of subsequent ager runs based on the newly determined idle list size. In step 703, the minimum size of the idle list (AMINP) is redetermined by summing the total configured memory (in pages) and the number of page reclaims by the process that instituted the page fault and then subtracting the resident memory (in pages). Suppose, for example, that the word processor had 3 page reclaims before a page fault occurred. Thus, the new minimum size for the idle list increases by three (16+3–3=16). The priority of the ager, if the idle list is 16 pages, is reset from IDLE to TIME_CRITICAL.

Likewise, in step 705, the maximum size of the idle list is redetermined, taking into consideration the number of page reclaims. As with the minimum size, the maximum size is incremented according to the number of page reclaims. Thus, in the example, the priority of the ager, if the idle list is 32 pages, is reset from no priority to IDLE.

In addition, both the minimum and maximum idle list size determinations take into consideration any changes in resident memory. Suppose, for example, that a new piece of software had been added to resident memory since system initialization. This would reduce the number of swappable pages available. The minimum and maximum sizes of the idle list would be reduced accordingly.

In step 707, a new ager priority table is written to RAM. Continuing with the example, this is shown in FIG. 8.

In step 709, the ager ages out pages to the idle list based on the new ager priority table (see FIG. 2).

The ager scans the page table for candidate swap out pages. As discussed above, the ager uses a least recently used algorithm and scans for the appropriate field of bits in the Page Table Entries to determine which pages were least recently used. These least recently used pages are linked to the idle list.

The virtual memory manager handles the actual swap out of pages identified by the idle list from RAM to the fixed disk. The method of FIGS. 5–7 are performed by the virtual memory manager 25 of FIG. 1.

On subsequent ager executions, the maximum and minimum sizes of the idle list are again determined. The number of page reclaims is counted from the previous ager execution because the reclaim counter (CURRCLMS) is reset whenever the ager is dispatched by the method of FIG. 6.

The present invention works best in conjunction with well behaved applications or programs that do not preempt the ager process from running within IDLE priority. For example, an application that polls for mouse or keyboard input may preempt the ager running on an IDLE priority. For such ill-behaved applications, some balance may be achievable by providing a higher priority for the ager based on the idle list maximum and minimum sizes.

The foregoing disclosure and the showings made in the drawings are merely illustrative of the principles of this invention and are not to be interpreted in a limiting sense.

What we claim is:

1. For use in a data processing system having primary memory and secondary memory and a virtual memory manager that swaps information between said primary and secondary memories, said virtual memory manager employing an ager to determine which information is eligible for swapping from primary memory to secondary memory and providing a listing of said eligible information, a method for dynamically determining execution priorities of said ager relative to non-ager methods on said data processing system, comprising the steps of:

a) determining a minimum size and a maximum size of said listing;

b) setting a first priority of said ager based upon said minimum size of said listing and setting a second priority of said ager based upon said maximum size of said listing;

c) determining if any information is reclaimed from said listing for use in said primary memory;

d) redetermining said minimum and maximum sizes of said listing based upon the amount of said reclaimed information; and e) resetting said first priority of said ager based upon said redetermined minimum size of said listing and resetting said second priority of said based upon said redetermined maximum size of said listing.

2. The method of claim 1, wherein:

a) said step of determining a minimum size and a maximum size of said listing further comprises the step of determining said minimum and maximum sizes of said listing based upon the difference between total primary memory and an initial amount of resident primary memory; and b) said step of redetermining said minimum and maximum sizes of said listing further comprises the step of redetermining said minimum and maximum sizes of said listing based upon the difference between said total primary memory and a subsequent amount of said resident primary memory.

3. The method of claim 1 wherein said step of resetting said first priority of said ager based upon said redetermined minimum size of said listing and resetting said second priority of said ager based upon said redetermined maximum size of said listing further comprises the step of resetting said first priority to a high priority and resetting said second priority to a low priority.

4. In a data processing system having primary memory and secondary memory and a virtual memory manager that swaps information between said primary and secondary memories, said virtual memory manager employing an ager to determine which information is eligible for swapping from primary memory to secondary memory and providing a listing of said eligible information, said virtual memory manager dynamically determining execution priorities of said ager relative to non-ager methods on said data processing system, said virtual memory manager comprising:

a) means for determining a minimum size and a maximum size of said listing;

b) means for setting a first priority of said ager based upon said minimum size of said listing and for setting a second priority of said ager based upon said maximum size of said listing;
c) means for determining if any information is reclaimed from said listing for use in said primary memory;
d) means for redetermining said minimum and maximum sizes of said listing based upon the amount of said reclaimed information; and
e) means for resetting said first priority of said ager based upon said redetermined minimum size of said listing and for resetting said second priority of said ager based upon said redetermined maximum size of said listing.

5. The virtual memory manager of claim 4, wherein:
a) said means for determining a minimum size and maximum size of said listing further comprises means for determining said minimum and maximum sizes of said listing based upon the difference between total primary memory and an initial amount of resident primary memory; and
b) said means for redetermining said minimum and maximum sizes of said listing further comprises means for redetermining said minimum and maximum sizes of said listing based upon the difference between said total primary memory and a subsequent amount of said resident primary memory.

6. The virtual memory manager of claim 4 wherein said means for resetting said first priority of said ager based upon said redetermined minimum size of said listing and resetting said second priority of said ager based upon said redetermined maximum size of said listing further comprises means for resetting said first priority to a high priority and resetting said second priority to a low priority.

* * * * *

UNITED STATES PATENT AND TRADEMARK OFFICE
CERTIFICATE OF CORRECTION

PATENT NO. : 5,555,399
DATED : September 10, 1996
INVENTOR(S) : Ted C. Waldron and Glenn E. Brew It is certified that error appears in the above-indentified patent and that said Letters Patent is hereby corrected as shown below:

Col. 6, line 41, delete "52" and insert --32--;

line 42, delete "S1" and insert --a--;

line 59, delete "41" and insert --42--;

Col. 7, line 29, delete "56" and insert --36--;

line 31, after the word "factor" insert --50--.

line 38, delete "56" and insert --36-- in both instances;
line 52, delete "31" and insert --32--;

line 53, delete "34" and insert --54--;

line 56, delete "61" and insert --62--;

line 57, delete "31" and insert --32--;

Col. 8, line 2, after the word "bit" insert --74--;

line 29, after the word "manager" insert --36--.

Signed and Sealed this

Twenty-fifth Day of March, 1997

BRUCE LEHMAN

*Attest:*

*Attesting Officer*   Commissioner of Patents and Trademarks